(12) United States Patent
Wei

(10) Patent No.: US 11,270,497 B2
(45) Date of Patent: Mar. 8, 2022

(54) OBJECT LOADING METHOD AND APPARATUS, STORAGE MEDIUM, AND ELECTRONIC DEVICE

(71) Applicant: Tencent Technology (Shenzhen) Company Limited, Shenzhen (CN)

(72) Inventor: Zhixiao Wei, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/078,053

(22) Filed: Oct. 22, 2020

(65) Prior Publication Data

US 2021/0042991 A1 Feb. 11, 2021

Related U.S. Application Data

(63) Continuation of application No. PCT/CN2019/115611, filed on Nov. 5, 2019.

(30) Foreign Application Priority Data

Nov. 15, 2018 (CN) .......................... 201811361060.0

(51) Int. Cl.
*G06T 15/20* (2011.01)
*G06T 1/60* (2006.01)
(52) U.S. Cl.
CPC ............... *G06T 15/20* (2013.01); *G06T 1/60* (2013.01)
(58) Field of Classification Search
None
See application file for complete search history.

(56) References Cited

U.S. PATENT DOCUMENTS

2004/0263512 A1 12/2004 Santodomingo et al.
2006/0008121 A1 1/2006 Zhang et al.
(Continued)

FOREIGN PATENT DOCUMENTS

CN 101635138 A 1/2010
CN 102663811 A 9/2012
(Continued)

OTHER PUBLICATIONS

Tencent Technology, ISR, PCT/CN2019/115611, Jan. 22, 2020, 2 pgs.

(Continued)

*Primary Examiner* — Jason A Pringle-Parker
(74) *Attorney, Agent, or Firm* — Morgan, Lewis & Bockius LLP

(57) ABSTRACT

This application discloses an object loading method performed at an electronic device. The electronic device determines a visible space located within an acquisition range of an image acquisition device located at a first position in a virtual scene and determines a target subspace located within a visible distance threshold indicated by a target type of a plurality of types in the visible space based on the first position, each type of the plurality of types having a visible distance threshold of an object in a subspace of the virtual scene. The electronic device then acquires an object whose visible distance is not greater than the visible distance threshold indicated by the target type in the target subspace as a to-be-rendered object and loads the to-be-rendered object in a storage resource of the user terminal to render an image of the virtual scene.

20 Claims, 9 Drawing Sheets

(56) References Cited

U.S. PATENT DOCUMENTS

| | | | | |
|---|---|---|---|---|
| 2007/0103480 | A1* | 5/2007 | Suzuno | G06T 17/05 345/582 |
| 2009/0327965 | A1* | 12/2009 | Averett | G06F 3/04842 715/835 |
| 2010/0231583 | A1* | 9/2010 | Furukawa | G06T 17/00 345/419 |
| 2016/0012634 | A1* | 1/2016 | Kishikawa | G06T 17/05 345/419 |
| 2017/0045941 | A1 | 2/2017 | Tokubo et al. | |

FOREIGN PATENT DOCUMENTS

| | | | |
|---|---|---|---|
| CN | 104867174 | A | 8/2015 |
| CN | 105701851 | A | 6/2016 |
| CN | 106991713 | A | 7/2017 |
| CN | 107291223 | A | 10/2017 |
| CN | 109523621 | A | 3/2019 |
| JP | H 1196396 | A | 4/1999 |
| JP | 2007132972 | A | 5/2007 |
| WO | WO 2007042700 | A1 | 4/2007 |

OTHER PUBLICATIONS

Tencent Technology, WO, PCT/CN2019/115611, Jan. 22, 2020, 4 pgs.

Tencent Technology, IPRP, PCT/CN2019/115611, May 18, 2021, 5 pgs.

Daniel Cohen-Or et al., "A Survey of Visibility for Walkthrough Applications", IEEE Transactions on Visualization and Computer Graphics, vol. 9, No. 3, Jul. 1, 2003, XP002400736, 20 pgs.

Extended European Search Report, EP19884357.5, dated Nov. 30, 2021, 13 pgs.

Roni Yagel et al., "Visibility Computation for Efficient Walkthrough of Complex Environments", Department of Computer and Information Science, Ohio State University, vol. 5, No. 1, Jan. 1, 1996, XP009067323, 16 pgs.

* cited by examiner

OBJECT LOADING METHOD AND APPARATUS, STORAGE MEDIUM, AND ELECTRONIC DEVICE

CROSS REFERENCE TO RELATED APPLICATIONS

This application is a continuation application of PCT Patent Application No. PCT/CN2019/115611, entitled "OBJECT LOADING METHOD, DEVICE, STORAGE MEDIUM, AND ELECTRONIC DEVICE" filed on Nov. 5, 2019, which claims priority to Chinese Patent Application No. 201811361060.0, filed with the State Intellectual Property Office of the People's Republic of China on Nov. 15, 2018, and entitled "OBJECT LOADING METHOD AND APPARATUS, STORAGE MEDIUM, AND ELECTRONIC DEVICE", all of which are incorporated herein by reference in their entirety.

FIELD OF THE TECHNOLOGY

This application relates to the field of Internet technologies, and specifically, to an object loading technology.

BACKGROUND OF THE DISCLOSURE

The concept of three dimensions (3D) is a concept of space. The space is composed of three axes X, Y, and Z with respect to a two-dimensional (2D) plane composed of only length and width.

The construction of a 3D virtual scene is one of the important applications of 3D. For example, a large-scale game is often provided with large scenes with numerous units such as people, animals, houses, trees, and stones. During the update of each frame of the game picture in a gaming process, objects in the scene are processed once sequentially, and the processing includes rendering and animation.

SUMMARY

Embodiments of this application provide an object loading method and apparatus, a storage medium, and an electronic device, to resolve at least a technical problem in the related art that a relatively large quantity of hardware resources are occupied to render objects in a virtual scene.

According to an aspect of the embodiments of this application, an object loading method is provided, including: determining a visible space located within an acquisition range of an image acquisition device in a virtual scene, the image acquisition device being an acquisition device located at a first position in the virtual scene; determining a target subspace located within a visible distance threshold indicated by a target type of a plurality of types in the visible space based on the first position, each type of the plurality of types having a visible distance threshold of an object in a subspace of the virtual scene; acquiring an object whose visible distance is not greater than the visible distance threshold indicated by the target type in the target subspace as a to-be-rendered object; and loading the to-be-rendered object into the memory for rendering on a display of the electronic device.

According to another aspect of the embodiments of this application, an object loading apparatus is further provided, including: a first determination unit, configured to determine a visible space located within an acquisition range of an image acquisition device in a virtual scene, the image acquisition device being an acquisition device located at a first position in the virtual scene; a second determination unit, configured to determine a target subspace within inside a visible distance threshold indicated by a target type of a plurality of types in the visible space based on the first position, each type of the plurality of types having a visible distance threshold of an object in a subspace of the virtual scene; an acquisition unit, configured to acquire an object whose visible distance is not greater than the visible distance threshold indicated by the target type in the target subspace as a to-be-rendered object; and a loading unit, configured to load the to-be-rendered object into the memory for rendering on a display of the electronic device.

According to another aspect of the embodiments of this application, a non-transitory computer-readable storage medium is further provided. The storage medium stores programs, the programs, when executed by a processor of an electronic device, cause the electronic device to perform the foregoing method.

According to another aspect of the embodiments of this application, an electronic device is further provided. The electronic apparatus includes a memory, a processor, and a plurality of computer programs stored in the memory and executable on the processor, the processor performing the foregoing method by using the computer program.

According to another aspect of the embodiments of this application, a computer program product is further provided. The computer program product includes instructions, the instructions, when run on a computer, causing the computer to perform the foregoing method.

In the embodiments of this application, a visible space located inside an acquisition range of an image acquisition device in a virtual scene is determined; an object whose visible distance is not greater than a visible distance threshold indicated by a target type in a target subspace is acquired as a to-be-rendered object; and the to-be-rendered object is loaded. For visible spaces located at different places, only objects that are actually visible to a user are loaded, so that a technical problem in the related art that a relatively large quantity of hardware resources are occupied to render objects in a virtual scene can be resolved, thereby significantly reducing the usage of memory resource, and reducing the consumption of hardware resources such as central processing unit (CPU) and graphics processing unit (GPU).

BRIEF DESCRIPTION OF THE DRAWINGS

To describe technical solutions in the embodiments of this application or in the related art more clearly, the following briefly describes the accompanying drawings required for describing the embodiments or the related art. Apparently, the accompanying drawings in the following description show merely the embodiments of this application, and a person of ordinary skill in the art may still derive other drawings from these accompanying drawings without creative efforts.

DESCRIPTION OF EMBODIMENTS

Figure 1:
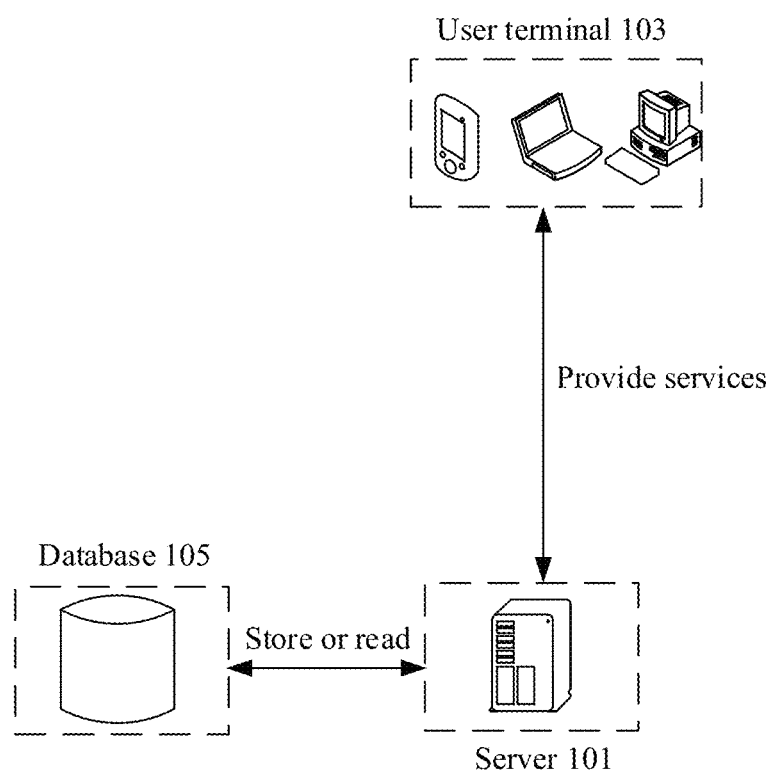
FIG. 1 is a schematic diagram of a hardware environment of an object loading method according to an embodiment of this application.

To make solutions of this application more comprehensible for a person skilled in the art, the following clearly and completely describes technical solutions in the embodiments of this application with reference to accompanying drawings in the embodiments of this application. Apparently, the described embodiments are merely a part rather than all of the embodiments of this application. All other embodiments obtained by a person of ordinary skill in the art based on the embodiments of this application without creative efforts shall fall within the protection scope of this application.

The terms such as "first" and "second" in the specification, claims, and accompanying drawings of this application are intended to distinguish between similar objects rather than describe a particular sequence or a chronological order. It is to be understood that the data termed in such a way are interchangeable in proper circumstances so that the embodiments of this application described herein can be implemented in orders except the order illustrated or described herein. In addition, the terms "include", "comprise" and any other variants are intended to cover the non-exclusive inclusion. For example, a process, method, system, product, or device that includes a series of steps or units is not necessarily limited to those expressly listed steps or units, but may include other steps or units not expressly listed or inherent to such a process, method, product, or device.

This application may be used to improve dynamic loading and continuous display of a large-scale 3D scene by a device having limited performance. For example, in a computer game, a virtual ultra-large 3D world is displayed for a user. Generally, a 3D scene has a large quantity of points, surfaces, and image data. The large-scale 3D scene simulates a virtual world that is at least a few square kilometers or more, and cannot completely loaded on the device having limited performance for processing.

To address the foregoing problems, according to an aspect of the embodiments of this application, an object loading method is provided. By using a technical solution of this application, scene content may be selectively loaded during processing. For example, only scene content within a visible range is loaded. Performance overhead is decreased, and scene content appears more coherently, that is, there is less visual freeze. According to another aspect of the embodiments of this application, the object loading method may further comprise unloading scene content not to be seen out of hardware resources such as a memory.

The object loading method provided in the embodiments of this application may be applied to an image processing device, for example, a terminal device or a server. The method may be applied to the terminal device. The terminal device, for example, may be a smart terminal, a computer, a personal digital assistant (PDA), a tablet computer or the like. The method may further be applied to the server. The server may be an independent server or may be a server in a cluster.

For example, in this embodiment, the object loading method may be applied to a hardware environment in FIG. 1 composed of a server 101 and/or a user terminal 103. As shown in FIG. 1, the server 101 is connected to the user terminal 103 by a network, and may be configured to provide services (for example, game services, application services, and the like) to the user terminal or a client installed on the user terminal. A database 105 may be disposed on or independent of the server, and may be configured to provide data storage and data reading services to the server 101. The network includes, but is not limited to, a wide area network, a metropolitan area network or a local area network. The user terminal 103 may include, but is not limited to, a personal computer (PC), a mobile phone, a tablet computer or the like.

The object loading method of this embodiment of this application may be performed by the user terminal 103. The object loading method performed by the user terminal 103 in this embodiment of this application may be alternatively performed by a client installed on the terminal. In an application scenario of this application, software, that is, a target application, may be used to render a large 3D scene (for example, scene rendering in a large-scale 3D game, a 3D animation or in VR display) on various computer devices (including, but not limited to, a PC, a mobile phone, a tablet computer, an embedded device, a server, a game console, and the like). The rendering herein may be understood as a process of a computer processing digital art content and drawing the content on a display device. The application scenarios of the technical solution of this application include, but are not limited to, the following scenarios:

1) In social applications that use augmented reality (AR), virtual reality (VR), and the like, after a user logs in, if a large quantity of objects (for example, landscape, buildings, other users, user pets, and the like in a scene) appear in the field of view of the user, a large quantity of performance resources need to be occupied for a long time image to render (including operations such as loading of object information in the memory and the rendering of a CPU and a GPU) a large quantity of objects. In this case, the technical solution of this application may be used to select objects that are visible to the current user from the large quantity of objects, and load and render the visible objects, thereby achieving the purpose of reducing hardware resources (for example, a CPU, memory, and a GPU) occupied by the image rendering.

2) In game applications, when a player is in a game process, a large quantity of objects such as other player characters, non player characters (NPC), landscape architecture, and the like may suddenly appear in the field of view of the player. Limited by performance resources of a terminal, the performance resources of the terminal are largely occupied by rendering operations at this moment, resulting in a great decrease in available performance resources of the terminal. Perceptions on a user side are that the terminal freezes, responds slowly, drops frames, and the like. In this case, the technical solution of this application may be used to select objects that are visible to the current user from the large quantity of objects, and load and render the visible objects, thereby achieving the purpose of reducing hardware resources occupied by the image rendering.

3) In military warfare, medical and other simulation applications, military warfare simulation applications are used as an example. When there are a large quantity of objects such as military personnel, military equipment, and military scenes in a field of view, a terminal may select objects that are visible to the current user from the large quantity of objects, and load and render the visible objects, thereby reducing hardware resources occupied by the image rendering.

The scenes in the foregoing embodiments generally have such characteristics: A large-scale 3D scene (generally covering more than a few square kilometers) needs to be rendered, there are numerous item objects (generally more than tens of thousands item objects) in the scene, details are complex, or even some products need to simulate a real ultra-large world that seems boundless. Actually, memory and processor performance in a device is limited, especially the memory and processor performance in a mobile device, is more limited. The entire scene cannot be completely loaded and processed. The visible scene area needs to be dynamically loaded, and invisible scene area needs to be dynamically unloaded, to implement rendering. The solution of this application is to resolve problems of dynamically loading and unloading scene areas in such products, and an optimized solution can be used to ensure that in a dynamic loading and unloading process, so that memory usage is minimized, and new objects that enter the view can be displayed smoothly.

Figure 2:
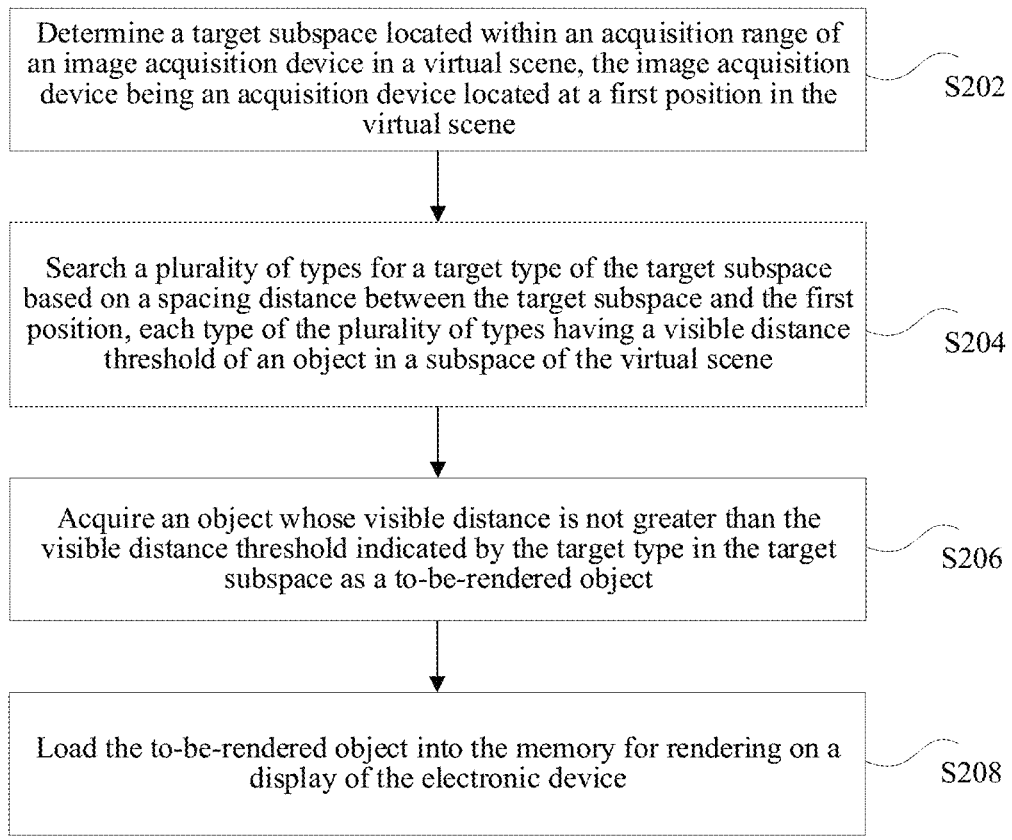
FIG. 2 is a flowchart of an optional object loading method according to an embodiment of this application.
Figure 3:
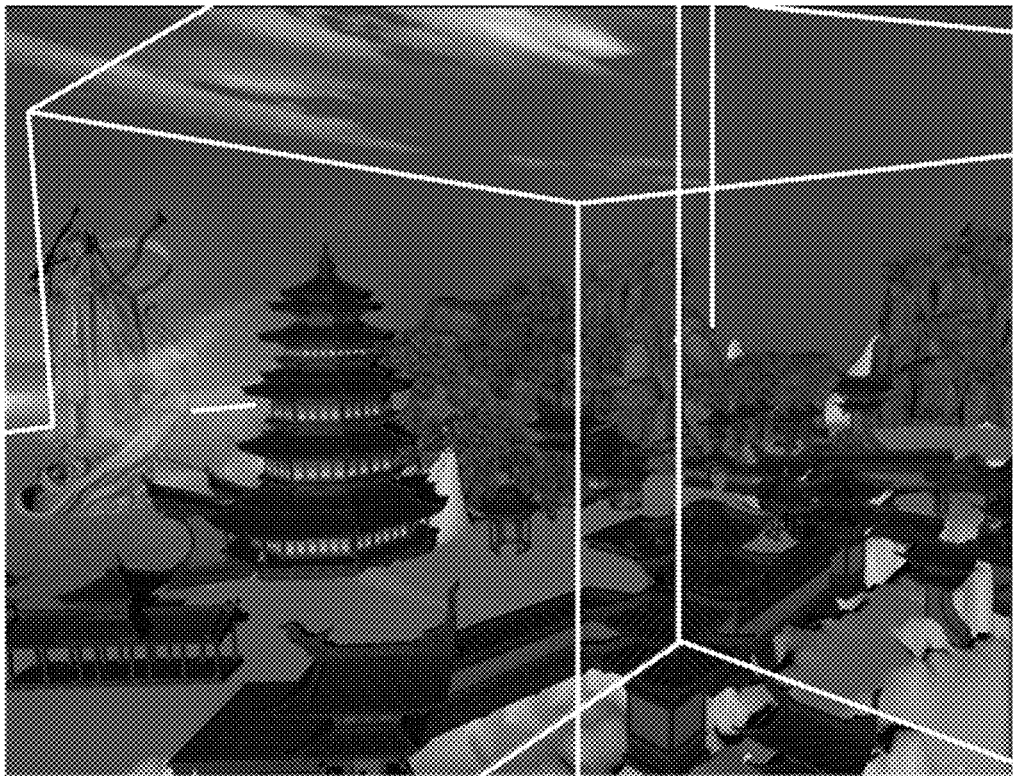
FIG. 3 is a schematic diagram of a grid block in an optional scenario according to an embodiment of this application.
Figure 4:
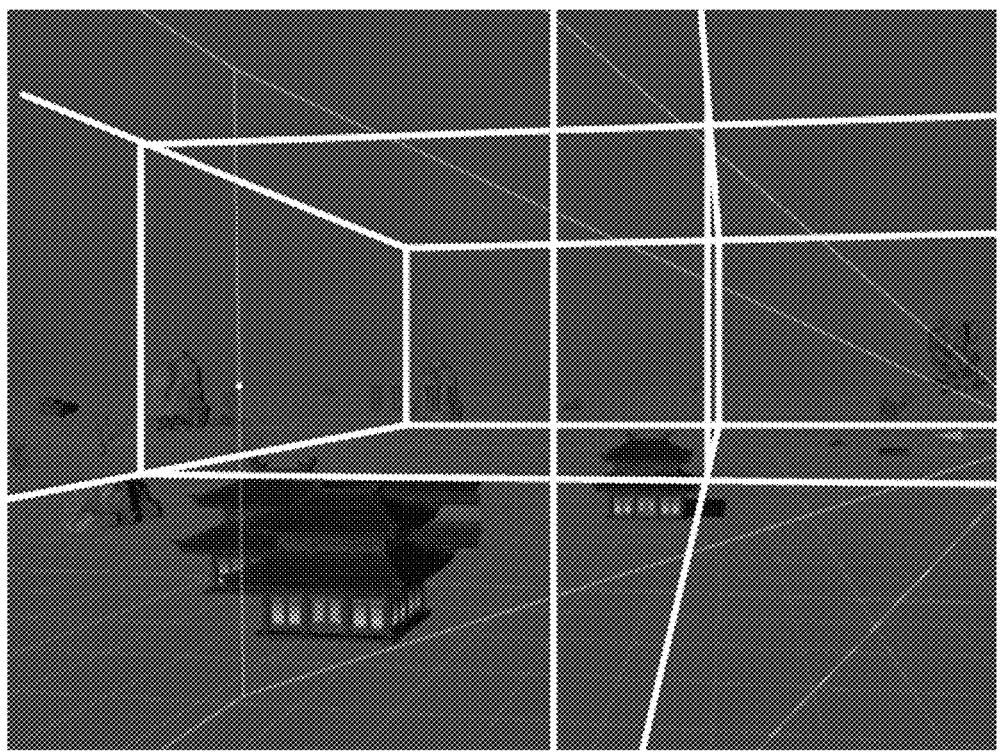
FIG. 4 is a schematic diagram of a grid block in an optional scenario according to an embodiment of this application.
Figure 5:
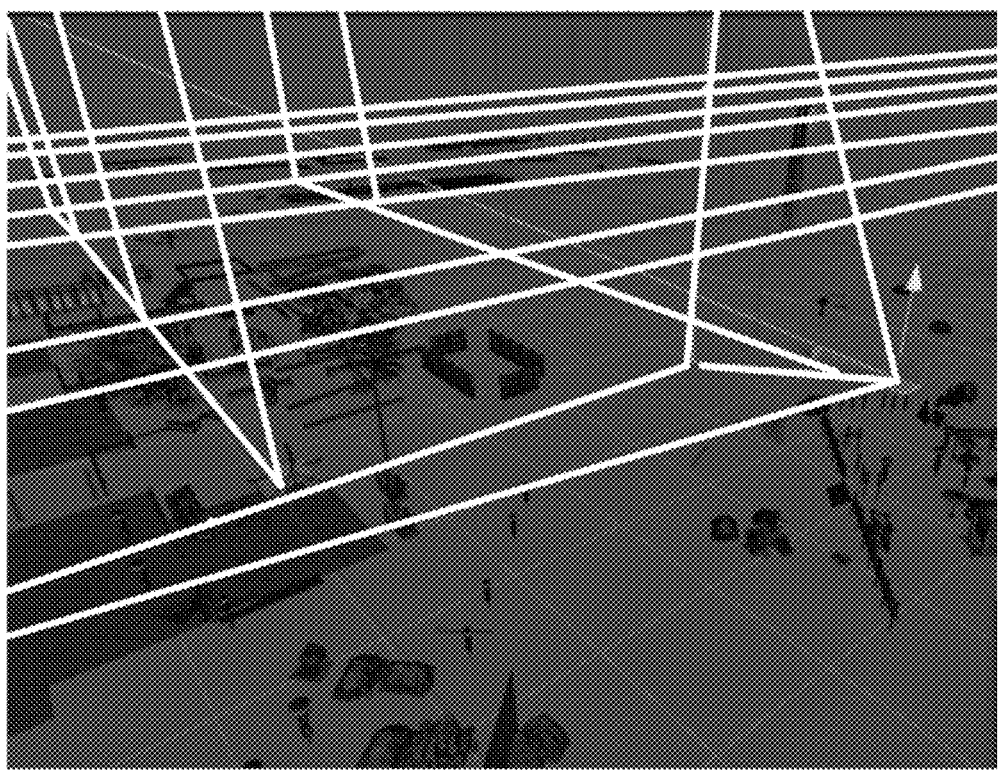
FIG. 5 is a schematic diagram of a grid block in an optional scenario according to an embodiment of this application.
Figure 6:
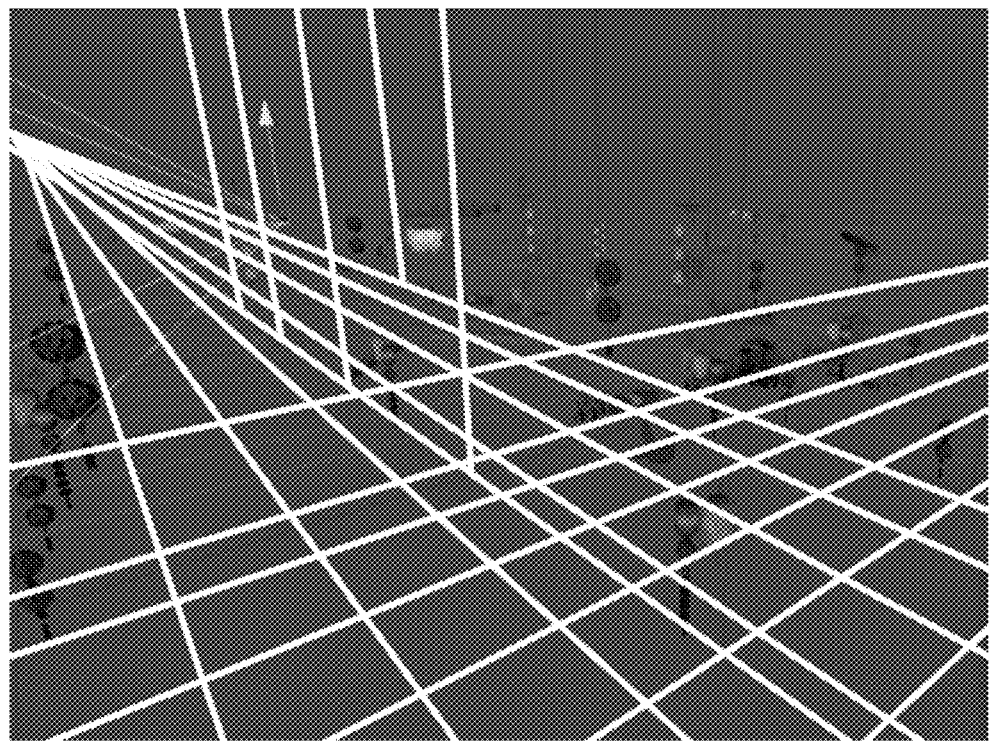
FIG. 6 is a schematic diagram of a grid block in an optional scenario according to an embodiment of this application.

Next, for example, a user terminal is used as an image processing device. An object loading method provided in the embodiments of this application is described. FIG. 2 is a flowchart of an optional object loading method according to an embodiment of this application. As shown in FIG. 2, the method may include the following steps:

S202. A user terminal determines a visible space located within an acquisition range of an image acquisition device in a virtual scene, the image acquisition device being an acquisition device located at a first position in the virtual scene.

The foregoing virtual scene may be a virtual scene provided by a target application. The foregoing target application may be an application using AR and VR, for example, a social application, a game application, a military warfare simulation application or a medical simulation application. The target application is installed on the user terminal to form a client. The virtual scene may be a social scene, a game scene, a simulation scene or the like. These scenes may be displayed through the client on the user terminal.

The foregoing image acquisition device may be a virtual image acquisition device, which is configured to simulate a first-person viewing angle and a third-person viewing angle (the viewing angle may also be referred to as the field of view angle, which is used for quantifying the angle of view of an observer, that is, a user who is currently observing the position of the scene) for image acquisition. That is, the visible range of the image acquisition device is a visible range of the user. The image acquisition device may be specifically a functional component invoked in a rendering engine, for example, a camera Camera in a game engine Unity.

The foregoing virtual scene is a 3D scene, that is, the content of the virtual scene simulated, calculated, and drawn on a display device by using a computer device (for example, the foregoing server or user terminal). The virtual scene may be divided into several subspaces (or referred to as a grid) according to an interval unit (for example, 1-meter interval or 10-meter interval). The foregoing visible space is a set of subspaces (which may include at least one subspace) located inside the acquisition range of the image acquisition device. For example, an acquisition distance of the image acquisition device is given, so that the subspace in the acquisition distance may be determined as the visible space according to the distance.

S204. The user terminal determines a target subspace located within a visible distance threshold indicated by a target type of a plurality of types in the visible space based on the first position, each type of the plurality of types having a visible distance threshold of an object in a subspace of the virtual scene.

S206. The user terminal acquires an object whose visible distance is not greater than the visible distance threshold indicated by the target type in the target subspace as a to-be-rendered object.

Optionally, for an object in the virtual scene (for example, scene objects such as landscape architecture, other users and pets), there is a particular visible distance (that is, the farthest distance at which the object can be seen). In other words, if the visible distance is exceeded, the object becomes invisible to the user. The foregoing each type of the plurality of types corresponds to a visible distance threshold. That is, the subspace of the virtual scene is categorized according to the visible distance. For subspaces of a same type, objects whose visible distances are greater than the corresponding visible distance threshold are filtered out in the same manner, thereby obtaining objects whose visible distances are less than or equal to the visible distance threshold, that is, objects in the target subspace, and only objects that are actually visible to the user are obtained.

S208. Load the to-be-rendered object into the memory for rendering on the user terminal. For example, the user terminal may load the to-be-rendered object in a storage resource of the user terminal where the target application is installed. The user terminal is configured to render an image of the virtual scene. The rendering herein is a process of a computer device processing digital art content and drawing the content on a display device.

Compared with the related art that objects in the entire scene are loaded, or all objects in a visible range of the user are loaded, in the technical solution of this application, only objects that are visible to the user are loaded, thereby significantly reducing memory requirements (that is, the memory required for loading the objects is smaller). In addition, fewer objects are processed by the CPU and the GPU, thereby reducing the consumption of hardware resources of the CPU and the GPU.

The foregoing embodiment is described by using an example that the object loading method of the embodiments of this application is performed by the user terminal 103. The object loading method of the embodiments of this application may be alternatively performed by the server 101. The difference between this embodiment and the foregoing embodiments is that the execution object is a user terminal instead of a server. The object loading method of the embodiments of this application may be alternatively jointly performed by the server 101 and the user terminal 103.

Through the foregoing steps, a visible space located inside an acquisition range of an image acquisition device in a virtual scene provided by a target application is determined; a target subspace located inside a visible distance threshold indicated by a target type of a plurality of types in the visible space is determined based on the first position; an object whose visible distance is not greater than the visible distance threshold indicated by the target type in the target subspace is acquired as a to-be-rendered object; and the to-be-rendered object is loaded in a storage resource of the user terminal where the target application is installed. Because loaded objects are actually visible to a user, a technical problem in the related art that a relatively large quantity of hardware resources are occupied to render objects in a virtual scene can be resolved, thereby significantly reducing the usage of memory resource, and reducing the consumption of hardware resources such as a CPU and a GPU.

This application automatically processes a large-scale 3D scene (that is, the foregoing virtual scene) into a detail grid structure with a plurality of levels (each level may be considered as a type, and the plurality of levels are the foregoing plurality of types). The feature of the grid is that there are grid densities and sizes on different levels. An item is placed on an appropriate level according to a visible distance thereof. During loading, after each detail level determines the visibility of the grid around an observation position, items in the grid are dynamically loaded and unloaded. The technical solution of this application is described in detail with reference to steps shown in FIG. 2 and by using an example that the technical solution of this application is applied to a game scene.

In the technical solution provided by S202, after the user enters a game application, the user terminal determines the visible space located inside the acquisition range of the image acquisition device in a virtual scene (to be displayed to the user) provided by the target application, the image acquisition device being the acquisition device located at the first position for simulating the field of view of the user in the virtual scene.

To separate the visible space located inside the visible range of the user from the entire virtual scene, in the technical solution of this application, visible cases of scene items may be quantified and organized in a spatial data structure in advance. The structure ensures that when the scene items are more detailed, the loading range is smaller, and space areas that are loaded and unloaded at the same time in the large-scale scene are always under a particular number. Most items are not included in a visual determination and loading process. While ensuring that the items in the visible range are accurately loaded, resources loaded into the device are minimized. The following is described in detail with reference to step 1 and step 2:

Step 1. Before determining the visible space located inside the acquisition range of the image acquisition device in the virtual scene provided by the target application, the user terminal determines the grid density corresponding to the each type of the plurality of types. In other words, each type of the plurality of types is used for representing a grid density (that is, a spatial division granularity of the virtual scene). Therefore, a quantity of types is equal to a quantity of types of grid densities.

Optionally, the user terminal may determine the grid density corresponding to the each type of the plurality of types by using step 11 and step 12 shown as follows.

Step 11. The user terminal acquires the maximum visible distance and the minimum visible distance in visible distances of all objects in the virtual scene.

When the user terminal acquires the visible distances of all the objects in the virtual scene for the maximum visible distance and the minimum visible distance, the visible distance of the each object in the virtual scene may be acquired in the following manner: predetermining a minimum visible screen occupation ratio Smin (that is, a preset parameter) of the object, calculating a product of multiplying a screen occupation ratio threshold (also referred to as the visible screen occupation ratio Smin) by twice the tangent value of a target viewing angle of the image acquisition device, the product being denoted as a second product, calculating a product of multiplying the maximum value of coordinates of the each object in three dimensions in a three-dimensional coordinate system (that is, the maximum value of the coordinates on the X-axis, Y-axis, and Z-axis) by the preset parameter (the preset parameter may be considered as a positive parameter that is preset, for example, 1.1), the product being denoted as a first product, and then calculating a ratio of the first product to the second product of the each object, the ratio being the visible distance of the each object. After the visible distance of the each object is calculated in the foregoing manner, the maximum visible distance and the minimum visible distance may be found in the visible distances of all the objects in the virtual scene.

In the foregoing embodiment, for the screen occupation ratio of the object, it is assumed that length pixels and width pixels in an area occupied by the object finally rendered on the screen are respectively h and w, and current length pixels and width pixels of an entire screen are respectively Sh and Sw. The smaller value of h/Sh and w/Sw is used as the current screen occupation ratio of the item. The minimum visible screen occupation ratio is the minimum screen occupation ratio visualized by the user.

Step 12. The user terminal determines the grid density corresponding to the each type of the plurality of types according to the maximum visible distance and the minimum visible distance.

The purpose of the user terminal to obtain the maximum visible distance Dmax and the minimum visible distance Dmin in the visible distances of all the objects is to equally divide a distance between the maximum visible distance and the minimum visible distance. Optionally, the quantity of equal divisions herein may be predetermined as m parts, that is, the value of m is predetermined. The visible distance corresponding to the $i^{th}$ (the value of i is greater than or equal to 1 and less than or equal to m+1) type is Dmin+i*(Dmax−Dmin)/m.

Optionally, the quantity of equal divisions herein may be determined according to the maximum visible distance Dmax and the minimum visible distance Dmin. For example, when the grid density corresponding to the each type of the plurality of types is determined according to the maximum visible distance and the minimum visible distance, a ratio of the maximum visible distance to the minimum visible distance is rounded down to obtain a first threshold (that is, the quantity of the equal divisions, which can be represented by n herein), and the first threshold may be alternatively used for representing the quantity of types of the plurality of types. (The maximum visible distance Dmax−the minimum visible distance Dmin)/the minimum visible distance Dmin is then used as the target distance. A grid spacing represented by the grid density corresponding to the $i^{th}$ type of the plurality of types is set to be i times the target spacing, i being an integer greater than 0 and less than or equal to the first threshold.

In this application, the user terminal may use different manners to divide multi-level grid. For example, a loading distance of each level in the multi-level grid is defined as a Dsequence={D1, D1*2, D1*3, D1*n} sequence. Certainly, another type of distance sequence may further be defined. Although there may be differences in loading and unloading effects, it is to be considered that regardless of relationship sequences between the multi-level grid spacings, all solutions in which a plurality of levels of loading a distance grid are designed and there is a relationship or no relationship between these spacings are similar to this solution.

Optionally, the user terminal may measure loading distances of the items in other manners, which is not necessarily D=1.1*max(Bx, By, Bz)/(2*S min*tan(fov/2)). It is to be considered that all the solutions based on the measurement of the loading distances for the items and loading on the multi-level detail grid based on the loading distances are similar to this solution.

Step 2. The user terminal creates configuration information for the each type of the plurality of types according to the grid density corresponding to the each type of the plurality of types, and saves the configuration information of the each type of the plurality of types to a configuration file, the configuration information recording an object in the subspace divided according to the corresponding grid density and a second position of the sub space.

Optionally, after the user terminal determines the grid density corresponding to the each type according to the foregoing content, when the configuration information for each type of the plurality of types is created according to the grid density corresponding to the each type of the plurality of types, the step may be implemented in the following manner.

Step 21. The user terminal determines the subspace (each grid is equivalent to a subspace) acquired by division according to the grid density corresponding to the each type of the plurality of types in the virtual scene. That is, for the each type, the entire virtual scene may be divided according to the grid density corresponding to the type, and the grid in the virtual scene is sequentially coded (each square is equivalent to a unit in three-dimensional space). The user terminal searches an object whose visible distance in each subspace matches the visible distance threshold indicated by the each type in the virtual scene. For the $i^{th}$ type, an object whose visible distance is in [i*Dmin, (i−1)Dmin) may be used as an object that matches the visible distance threshold indicated by the $i^{th}$ type. Meanwhile, a grid where the object is in the virtual scene is located, and an association relationship between the each subspace and a found object is saved in a piece of configuration information. Each type of the plurality of types may be saved in the piece of configuration information, and each piece of configuration information saves all the objects in the grid under the corresponding grid densities.

In an optional embodiment, if for a type, there is no visible object under the corresponding grid density, configuration information under this type may be deleted to save storage space.

In the technical solution provided by S204, the user terminal determines the target subspace located inside the visible distance threshold indicated by the target type of the plurality of types in the visible space based on the first position, each type of the plurality of types being used for indicating the visible distance threshold of the object in a subspace of the virtual scene.

The foregoing target type is any type of the plurality of types. In other words, for each type, there may be corresponding a target subspace, that is, for the $i^{th}$ type, a subspace whose distance from the first position is in i*Dmin may be used as the target subspace corresponding to the $i^{th}$ type.

Optionally, when the user terminal determines the target subspace located inside the visible distance threshold indicated by the target type of the plurality of types in the visible space based on the first position, the step may be implemented in the following manner.

Optionally, the user terminal may acquire a spacing distance between the subspace of the visible space and the first position; and use a subspace whose spacing distance from the first position is not greater than the visible distance threshold indicated by the target type in the visible space as the target subspace.

In the technical solution provided by S206, the user terminal acquires the object whose visible distance is not greater than the visible distance threshold indicated by the target type in the target subspace as the to-be-rendered object.

In this embodiment, the user terminal acquires the object whose visible distance is not greater than the visible distance threshold indicated by the target type in the target subspace as the to-be-rendered object may be implemented in the following manner: the user terminal acquires a configuration file, the configuration file recording objects associated with each type of the plurality of types in the subspace (or referred to as a grid) of the virtual scene that is divided according to the foregoing grid density, each object in the subspace of the virtual scene being set to be associated with a type of the plurality of types whose visible distance is not greater than the indicated visible distance threshold; and acquires an object that is recorded in the configuration file and is associated with the target type in the target subspace as the to-be-rendered object.

When the user terminal determines the to-be-rendered object according to the object associated with the target type in the visible space recorded in the configuration file, all the objects associated with the target type in the visible space may be considered as to-be-rendered objects.

In the technical solution provided by S208, the user terminal loads the to-be-rendered object in the storage resource of the user terminal where the target application is installed, the user terminal being configured to render an image of the virtual scene. The rendering herein is the process of the computer device processing digital art content and drawing the content on the display device.

Optionally, when the user terminal loads the to-be-rendered object in the storage resource of the user terminal where the target application is installed, in a case that currently saved objects in the storage resource of the user terminal include the to-be-rendered object, the to-be-rendered object continues to be saved in the storage resource of the user terminal, and objects other than the to-be-rendered object in the storage resource of the user terminal are deleted. That is, in a case that some or all objects in current rendering and previous rendering are the same, only to-be-rendered objects that are not included in the previous time need to be added, and objects that need to be rendered in the previous rendering but do not need to be rendered in the current rendering are deleted. In a case that the currently saved objects in the storage resource of the user terminal do not include the to-be-rendered object, objects that are saved in the storage resource of the user terminal are deleted, and the to-be-rendered object is loaded to the storage resource of the user terminal. That is, in a case that the current rendering and the previous rendering are completely different, all the objects in the previous rendering are directly deleted, and the to-be-rendered object of the current rendering is then added.

Optionally, after the user terminal loads the to-be-rendered object in the storage resource of the user terminal where the target application is installed, the grid density of the target subspace is set to match the grid density corresponding to the target type, and the to-be-rendered object is rendered in the target subspace after the grid density is set, any type of the plurality of types being used for indicating that an object whose visible distance is not greater than the visible distance threshold indicated by the any type in the subspace of the virtual scene is rendered according to the grid density corresponding to the any type, a grid density corresponding to a first type of the plurality of types being greater than a grid density corresponding to a second type of the plurality of types, a visible distance threshold indicated by the first type being less than a visible distance threshold indicated by the second type.

By using the technical solution of this application, the user terminal quantifies visible distances of all the items in the scene and organizes the items in a data structure of a multi-level scene grid. The visible distance of the item is used as a basic unit. When a program is run, for an inspection scope of the visibility listed by fixed quantity of grids around an observation position of each level, the visibility of the item is determined and the item is loaded. Because tiny items are in a scene grid having a smaller scale, the more detailed object has a smaller scope of determining the visibility, and the amount of memory in which the object is loaded is smaller, thereby reducing the occupation of resources of system storage, a CPU, and a GPU.

As an optional embodiment, the technical solution of this application is further described in detail by using an example that the technical solution of this application is applied to a virtual scene of a game.

In related technical solutions for loading a large 3D scene, for example, in the engine Unity3D, a large scene is manually divided into several separate small scenes for production simply according to a spatial position. The small scenes are dynamically loaded and unloaded when a program is run. In the engine UnrealEngine4, a large scene is manually divided into several sub-levels. Each sub-level may be individually set with a loading distance and items in the scene. There is no necessary spatial relationship between the sub-levels. The loading distance of the each sub-level is traversed to determine loading and unloading thereof when the program is run.

In the foregoing related technical solutions, a full-scene loading method is used. In the method, the occupation of ultra-large scene loading is a bottleneck for the device memory. In mainstream commercial game engines represented by Unity3D and UnrealEngine4, although these solutions can implement the accuracy of loading items in the large scene, the solutions cannot minimize the device memory usage by the scene, resulting in excessive loading.

The applicant realizes that, ideally, only visible items may be loaded, thereby ensuring the accuracy of loading and minimizing the consumption of hardware resources. In the solutions in the related art, a spatial position is used as a basic unit for loading or editing. However, there are objects having different volumes and levels of detail in the same space area. At a given observation distance, visibilities of objects having different volumes and details are different. The loading of the entire related area causes a waste of unnecessary memory.

If the scene is manually divided into sub-scenes, when the scene reaches a particular scale, the time consumed by manual division is unbearable, and it is c very difficult to completely accurately place items in the most suitable grid. In the solution, according to the visible distance of the item, an algorithm is used to automatically divide the scene into the multi-level grids, which is more scientific and saves manpower.

The core of the technical solution of this application is that the loading distance of a scene item is related to the visible distance of the item. The loading is not performed by using the spatial position as the basic unit, but instead, by using the visible distance of the item as the basic unit. First, visible distances of all the items in the scene are quantified and organized in a data structure of the multi-level scene grid. When a program is run, for an inspection scope of the visibility listed by a fixed quantity of grids around an observation position of each level, the visibility of the item is determined and the item is loaded. Because tiny items are in a scene grid having a smaller scale, the more detailed object has a smaller scope of determining the visibility, and the amount of memory in which the object is loaded is smaller. This also conforms to a rule that when an item is smaller, the visible distance is smaller.

The solution mainly includes two stages of implementation. The first stage is a preprocessing of a scene. The second stage is to dynamically load and unload a part of the scene in a processed scene. Next, for example, a user terminal is still used as an image processing device for description.

In a preprocessing process of the user terminal, a scene may be automatically processed into a multi-level detail grid structure indicated by this application. The solution of processing a scene into a multi-level detail grid is an important component of this application. The solution facilitates the loading of a scene according to the level of detail of items during dynamic loading, and minimizes resources occupied by a device during loading. A result of the preprocessing of the scene is that each object in the scene is divided to a spatial block of a level L. For example, FIG. 3 to FIG. 6 show scene items included in different levels of grid blocks. Scales of grids shown from FIG. 3 to FIG. 6 gradually decrease. It can be seen that when the scale of the grids is smaller, the sizes of the scene items included in the grid are smaller and the loading distances of the scene items are smaller. A level having a relatively large scale of grids includes more coarse-grained scene items. A level having a relatively small scale of grids includes more detailed scene items.

Following formulas are defined in the expressions of following calculation steps.

Figure 7:
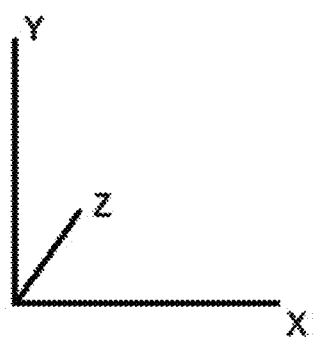
FIG. 7 is a schematic diagram of a coordinate system in an optional scenario according to an embodiment of this application.

For the definition of a coordinate system, the coordinate system in which the solution of this application is applied may be a 3D Cartesian coordinate system. As shown in FIG. 7, three axes of the coordinate system are X-axis, Y-axis, and Z-axis.

max(n0, n1, n2, . . . ) represents calculating the maximum value in this sequence n0, n1, n2, . . . .

tan(x) represents calculating the tangent value of x (in radians).

floor(x) represents the maximum integer in all integers that are not greater than x.

ceil(x) represents the minimum integer in all integers that are not less than x.

abs(x) represents the absolute value of x.

Figure 8:
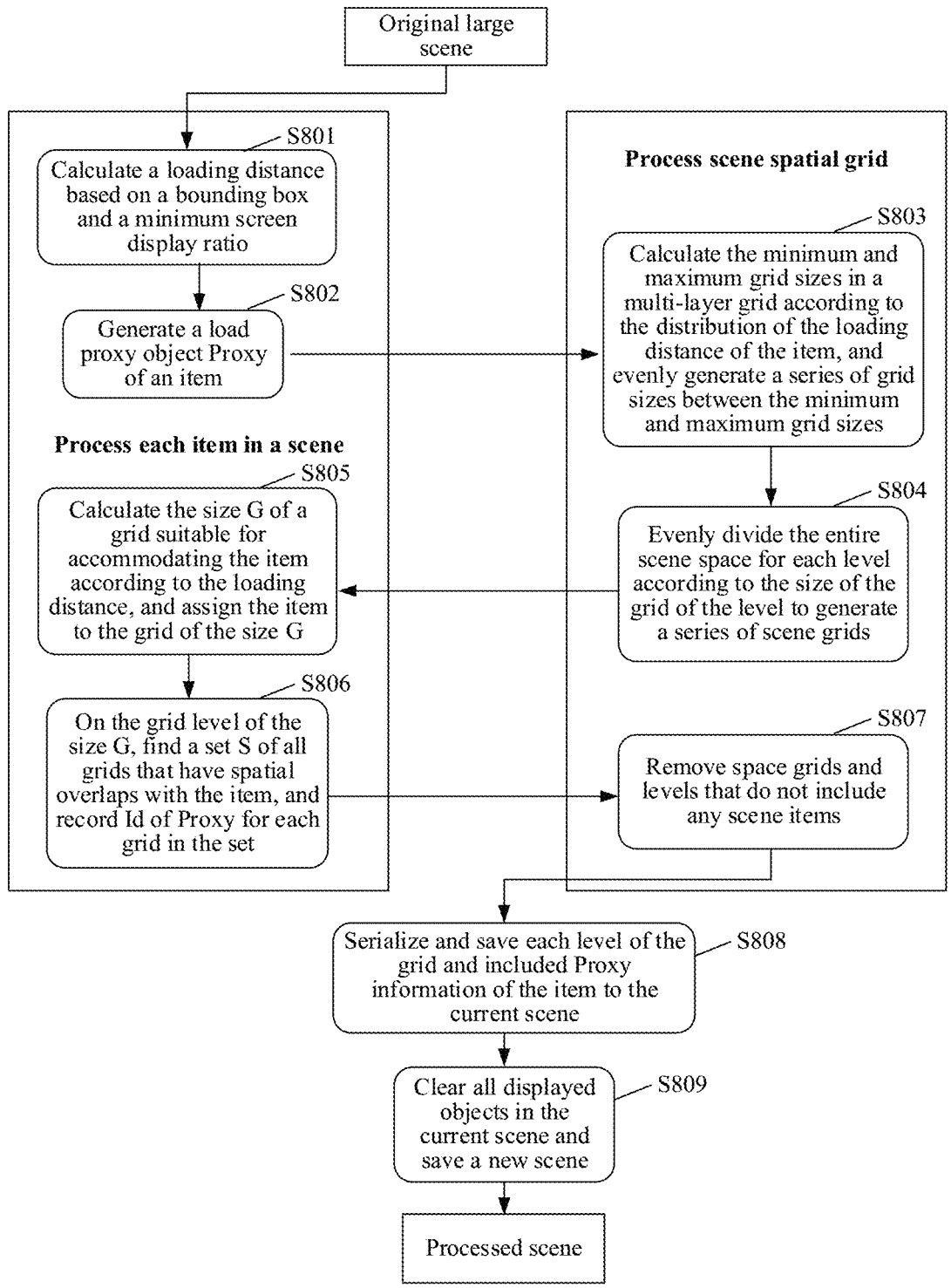
FIG. 8 is a flowchart of preprocessing of an optional scenario according to an embodiment of this application.

A processing procedure of a preprocessing stage of a scene by a user terminal is shown as a flowchart in FIG. 8. On the left side, the user terminal processes each item (or referred to as an object) in the scene. On the right side, the user terminal processes scene space grids.

Detailed steps are described as follows:

S801. The user terminal calculates a loading distance based on a bounding box and a minimum screen display ratio (that is, the smallest screen occupation ratio).

Figure 9:
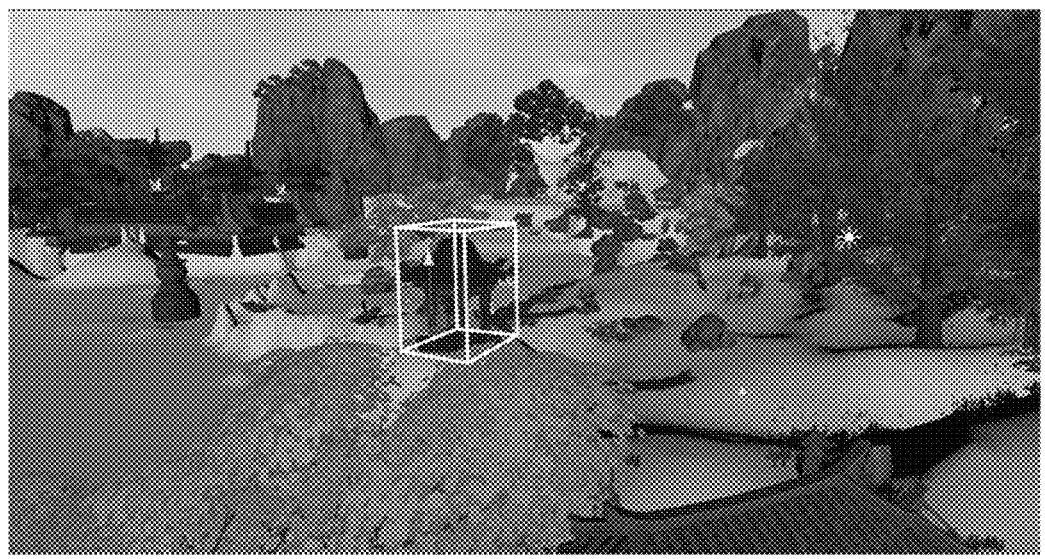
FIG. 9 is a schematic diagram of a bounding box in an optional scenario according to an embodiment of this application.

An input of the preprocessing may be a scene resource object in an original large scene edited by art designers by using various scene editors. Scene resources are composed of a plurality of scene items. A scene item is a relatively independent rendering object entity (for example, a stone, a tree, a building or the like) in a scene. The scene item usually includes a world coordinate position P of the scene where the scene item is located. P may be represented by using a three-dimensional coordinates (Px, Py, Pz). In addition, each scene item further includes a bounding box Bounds (xmin, ymin, zmin, length, height, width) and the minimum visible screen occupation ratio Smin thereof. Usually in rendering, it may be considered that if a current screen occupation ratio of an object is less than Smin, the item is invisible (for example, an object that is far away from an observation position has a small screen occupation ratio). A large scale of the scene means that an area where the items are distributed in the scene is very large. The area may cover more than a few kilometers, and the quantity of items in the scene is large and is usually greater tens of thousands. FIG. 9 is a typical input scene. A cube in FIG. 9 represents a bounding box of this building.

A bounding box of an object, that is, a cube with the smallest volume of an object is referred to as the bounding box of the object. The bounding box of the object may be represented as a 6-element value Bounds (xmin, ymin, zmin, length, height, width). xmin, ymin, and zmin respectively represent the minimum value of the area included in the bounding box on the world axes x, y, and z. length, height, width respectively represent span lengths of the area included in the bounding box in three directions of the world axes x, y, and z.

S802. Generate a load proxy object Proxy of an item.

The user terminal traverses all the items in the scene, and calculates a loading distance D for each traversed item. It is assumed that the field of view angle of a current observation position is fov (in radians), and a calculation method of D is defined as D=1.1*max(Bx, By, Bz)/(2*S min*tan(fov/2)). The meaning is that when a distance between the item and the observation position is greater than D, the item may be considered invisible. The calculation of D is related to the current observation position and the minimum screen occupation ratio of the item.

The user terminal traverses and calculates all the items in the scene. The load proxy object is generated for each traversed item. Proxy may include the following several elements in the parentheses (Path, P, R, S, D, B, and id). Path is a resource path of this item, D is a loading distance, P is a position in the scene, R is rotation, S is scaling, B is a bounding box, and id is the unique identifier of this scene item.

S803. Calculate the minimum and maximum grid sizes Gmin and Gmax in a multi-layer grid according to the distribution of the loading distance of the item, and evenly generate a series of grid sizes {Gmin, Gmin*2, Gmin*3, Gmax} between Gmin and Gmax.

The user terminal calculates the loading distances of all the scene items to find the minimum loading distance Dmin and the maximum loading distance Dmax. A set of sequence Dsequence={D1, D1*2, D1*3, D1*n} is generated according to Dmin and Dmax. n=ceil(Dmax/Dmin), and D1 may be Dmin. The size of the bounding box Bscene of the entire scene is calculated. The size of Bscene is the minimum cube that can include all the objects in the scene. The 6-element value of Bscene is represented as (Bscene_x, Bscene_y, Bscene_z, Bscene_length, Bscene_height, Bscene_width).

S804. Evenly divide the entire scene space for each level according to the size of the grid of the level to generate a series of scene grids.

Figure 10:
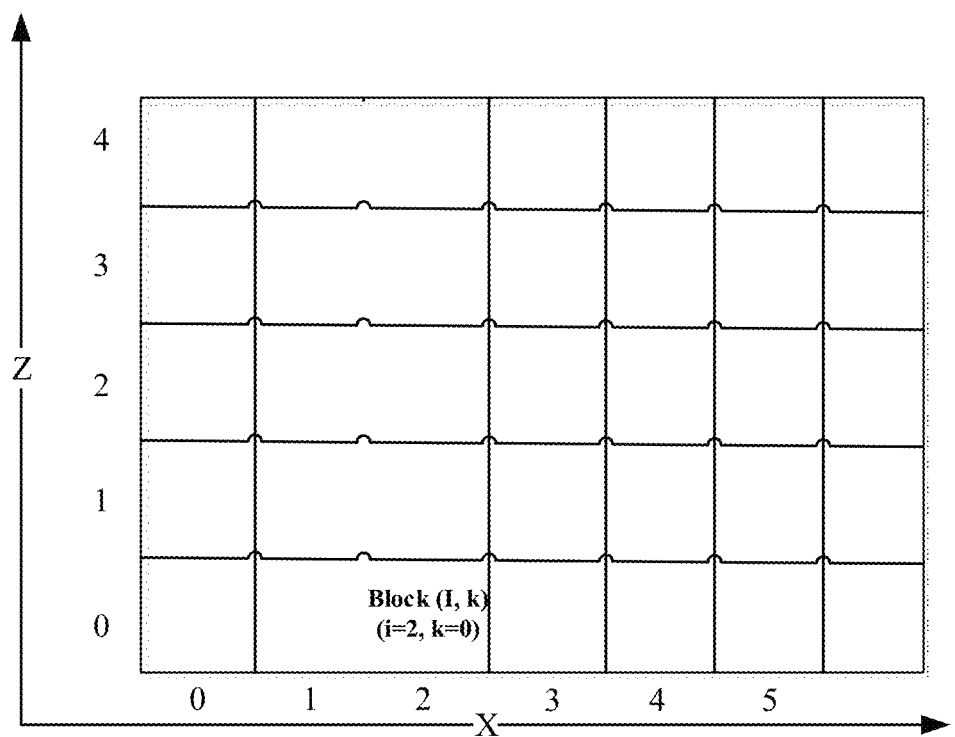
FIG. 10 is a schematic diagram of a grid in an optional scenario according to an embodiment of this application.

The user terminal generates a set of grid levels based on Dsequence. Each element Di (where 1<=I<=n) in Dsequence represents the $i^{th}$ level of grid. An operation of traversing each level is as follows: on the 1th level, the scene is evenly divided into a grid structure shown in FIG. 10, which is composed of a plurality of blocks. A block that is in the $i^{th}$ column in the x-axis direction and in the $k^{th}$ row in the z-axis direction is represented as Block(l, i, k). Each Block includes at least two elements, which are an included id list of a scene item proxy object, and the bounding box Bounds(l, i, k) thereof. The 6-element value of Bounds(l, i, k) is represented as [(i+0.5)*D1+Bscene_x, Bscene_y, (k+0.5)*D1+Bscene_z, D1, Bscene_height, D1].

S805. Calculate the size G of a grid suitable for accommodating the item according to the loading distance, and assign the item to the grid of the size G.

The user terminal traverses all proxy objects Proxy in the scene. First, the grid level L where the item is located is selected according to the loading distance D thereof. L is the smallest one in all the elements that are greater than or equal to D in the Dsequence.

S806. On the grid level of the size G, find a set S of all grids that have spatial overlaps with the item, and record Id of Proxy for each grid in the set.

Next, the user terminal traverses all blocks on the $L^{th}$ level and calculates an overlap ratio S between the bounding box Bounds(l, i, k) of each block and the bounding box B of the proxy object Proxy. The calculation of an overlap ratio between the two bounding boxes is to calculate their overlapped space area. If S>0, it indicates that the scene item related to the proxy object is in the area of this block Block(l, i, k). If the overlap ratio S between Block(l, i, k) and Proxy is greater than 0, Id of Proxy is recorded in the id list of this Block(l, i, k).

S807. Remove space grids and levels that do not include any scene items.

The user terminal traverses each spatial block Bounds(l, i, k) of each level of the grid to find the block whose id list content is empty and deletes the block. Each level of the grid is traversed and the level whose quantity of spatial block is 0 is deleted.

S808. Serialize and save each level of the grid and included Proxy information of the item to the current scene.

The user terminal saves all current remaining spatial grid blocks Bounds(l, i, k) to a scene file.

S809. Clear all displayed objects in the current scene and save a new scene (that is, a processed scene).

The user terminal saves all the proxy object Proxy information to the scene file, clears all the scene items in the scene, and saves a new scene file.

Figure 11:
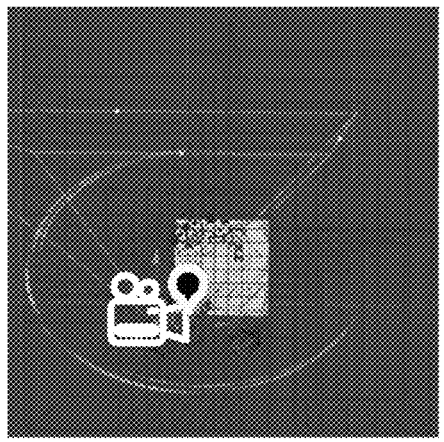
FIG. 11 is a schematic diagram of an optional scenario according to an embodiment of this application.
Figure 11:
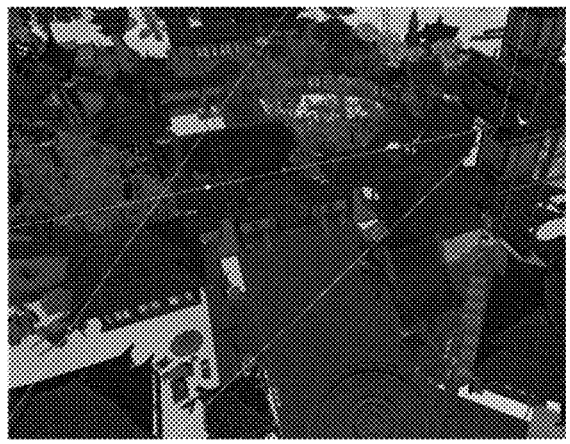
Figure 12:
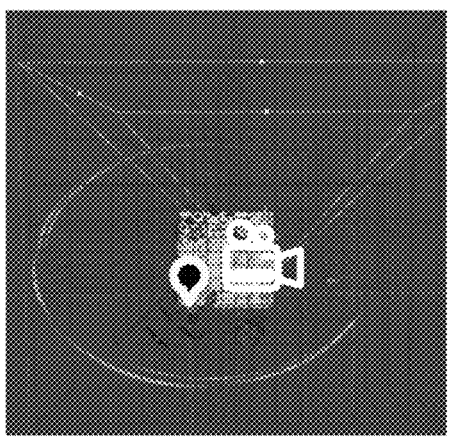
FIG. 12 is a schematic diagram of an optional scenario according to an embodiment of this application.
Figure 12:
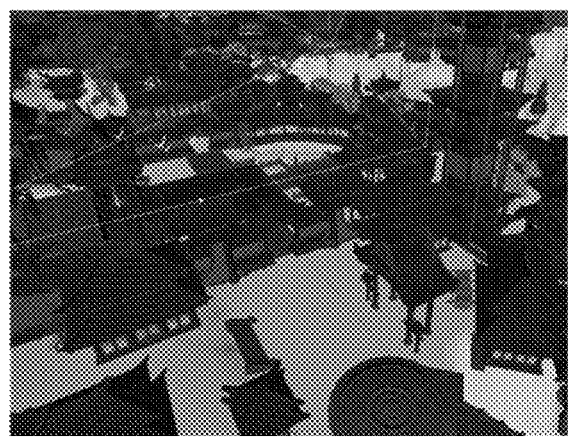
Figure 13:
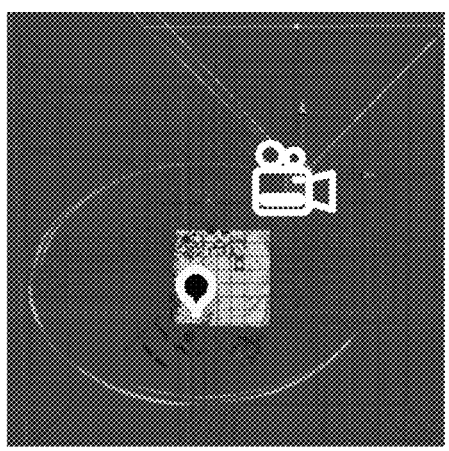
FIG. 13 is a schematic diagram of an optional scenario according to an embodiment of this application.
Figure 13:
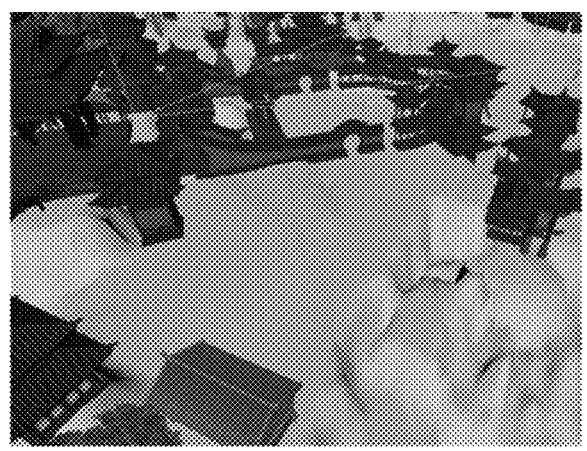

When the solution of this application is run, in part of the solution, after being preprocessed, a scene may be dynamically loaded or unloaded during running. That is, a current visible item is accurately found according to the position of a current observer (or a camera position) and loaded. For the loading and unloading process of the scene with the observation position, reference may be made to FIG. 11 to FIG. 13, which show a fixed area of the scene. As the observation position (camera) moves in the scene, items loaded in this scene area change. As shown in FIG. 11 to FIG. 13, a change trend is that when the observation position is closer to this area, the detail level of this area is richer, and when the observation position is farther away from this area, loaded tall objects tend to remain in this area. It is consistent with the actual case, that is, when an area is far away, only obvious objects in the area can be seen, and detailed objects gradually disappear. Compared with a scene loading method that does not consider a space detail level, this solution may minimize the quantity of the items loaded in the current scene.

Figure 14:
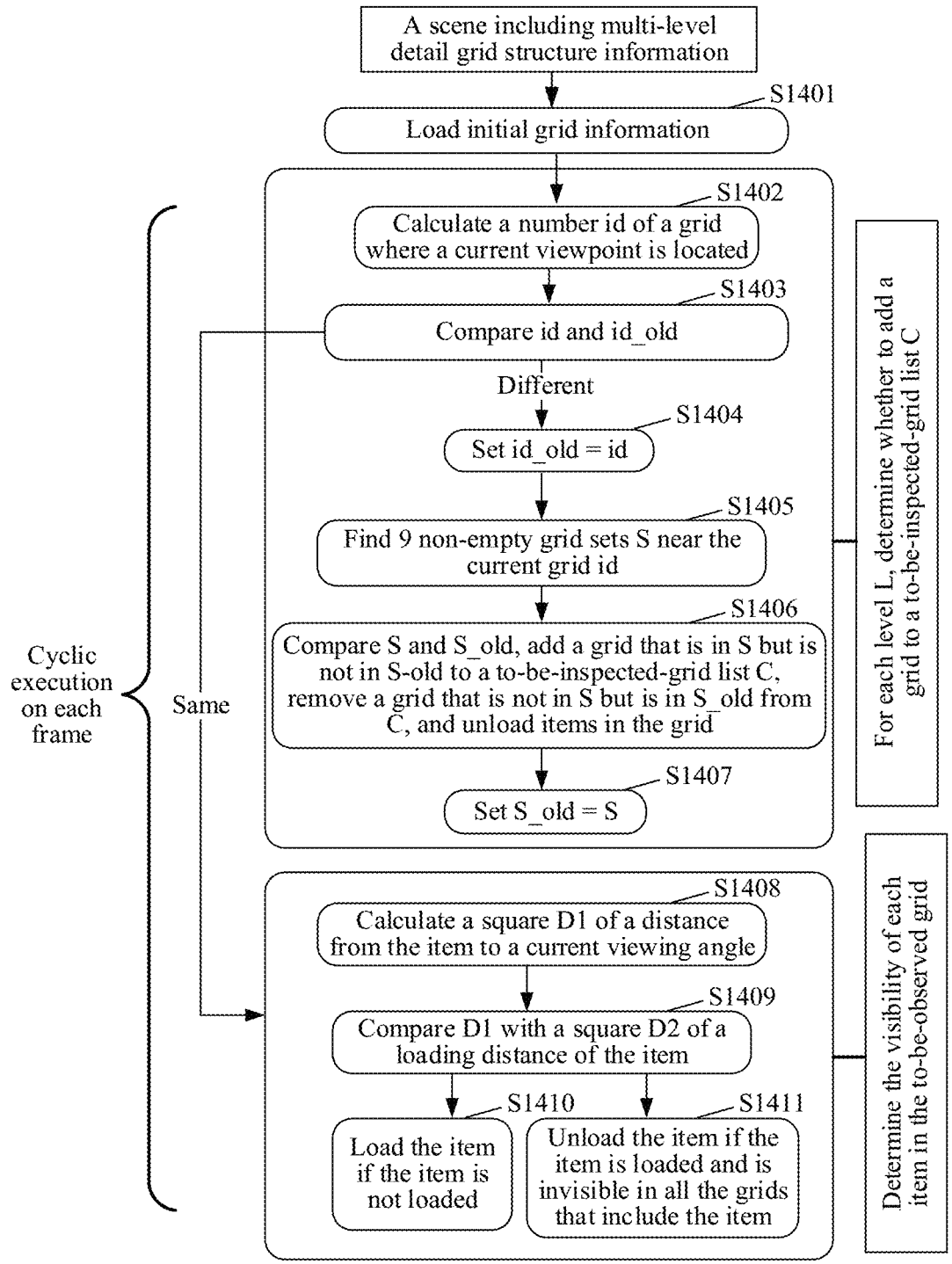
FIG. 14 is a flowchart of object loading of an optional scenario according to an embodiment of this application.

When a scene loading stage is run, a loading and unloading process is shown as the flowchart in FIG. 14. The processing in the flowchart is performed on each frame during running. A processing process of each frame is divided into two parts. In the first part, a current visible scene grid is determined based on the viewpoint on each level of the grid, and is added to a to-be-inspected-grid list. In the second part, it is determined, according to a loading distance of each item in the to-be-inspected-grid list, whether the each item needs to be loaded An optional implementation step is as follows:

S1401. A user terminal loads initial grid information for a scene including multi-level detail grid structure information.

When a program is started (or a scene is initialized), the user terminal loads a scene file and saves all spatial grid blocks Bounds(l, i, k) of a current scene and a scene item proxy object Proxy to a memory.

In each frame (or periodically) of the program running, the following third step and the following procedures are performed.

First, for each level L, it is determined whether to add a grid to a to-be-inspected-grid list C.

S1402. The user terminal calculates a number id of a current grid where a current viewpoint is located.

S1403. The user terminal determines whether current id is the same as id_old, and if id is the same as id_old, perform S1408, or if id is not the same as id_old, perform S1404.

S1404. The user terminal sets id_old=id.

S1405. The user terminal finds 9 non-empty grid sets S near the current grid id.

S1406. The user terminal compares S and S_old, adds a grid that is in S but is not in S-old to a to-be-inspected-grid list C, removes a grid that is not in S but is in S_old from C, and unloads items in the grid.

S1407. The user terminal sets S_old=S.

In the foregoing solution, 3D coordinates of a current observation position may be obtained as Location. The following calculations are performed by traversing current each level of grid: on the $1^{st}$ level of grid, scene grid coordinates P_location where the Location is located are calculated. A grid number Li of P_location on the x-axis is floor((Location.x−Bscene_x)/D1), and a grid number Lk on the z-axis is floor((Location.z−Bscene_z)/D1). All grid blocks Block(l, i, k) that meet abs(Li−i)<=1 and abs(Lk−k) <=1 are found. All Proxy recorded in id lists of the Block are added to a to-be-loaded list LoadList of the current scene.

The visibility of each item in the to-be-observed grid is determined.

S1408. The user terminal calculates a square D1 of a distance from the item to a current viewing angle.

S1409. The user terminal compares D1 with a square D2 of a loading distance of the item.

S1410. If the comparison result is that D1 is less than or equal to D2, load the item if the item is not loaded.

S1411. If the comparison result is that D1 is greater than D2, unload the item if the item is loaded and is invisible in all the grids that include the item.

In the foregoing solution, for all proxies that are loaded in the current scene, the user terminal checks whether the item is in a LoadList. If the item is not in the LoadList, the item is unloaded or concealed. Each scene item proxy object Proxy in the current LoadList is traversed. A distance D of the item from the current observation position is calculated. If D<Proxy.D, the item is loaded. That is, item resource path and position information of Proxy is read and is loaded and displayed at the position. The current LoadList is cleared.

The use of the technical solution of this application has at least the following technical effects. In this solution, the loading and continuous display of ultra-large 3D scenes on hardware devices (for example, mobile phones) having limited performance by using a solution of dynamically loading and unloading the content of a scene area. Compared with other solutions in the existing industry, the biggest performance improvement of this solution is that the organization of scene into a multi-layer detail grid structure is equivalent to the expression of level of detail information of different items in the scene, and the loading of an item based on a visible distance instead of the loading of an item according to a same spatial distance without considering the level of detail for the scene area in existing mainstream solutions, thereby minimizing the loading of detail objects that are actually invisible, reducing memory occupation caused by scene loading, and reducing the complexity of graphic rendering. At the same scene observation position, as a camera moves away, tall buildings are still loaded and more detailed objects gradually disappear. In the related solutions, it is difficult for a block loading solution that does not consider the level of detail to ensure that detailed objects disappear before tall objects. Usually, to ensure that tall buildings are observed at a long distance and the size of a loading block is enlarged, a lot more invisible detail items are loaded. The division and processing of a scene detail level structure of this solution are completely automated. In actual project applications, art designers of scenes do not need to consider the block division or block design of scene items, and the production process is simple.

To make the description simple, the foregoing method embodiments are stated as a series of action combinations. However, a person skilled in the art needs to know that this application is not limited to the described sequence of the actions because according to this application, some steps may use another sequence or may be simultaneously performed. In addition, a person skilled in the art shall also know that all the embodiments described in the specification are exemplary embodiments, and the related actions and modules are not necessarily mandatory to this application.

According to the foregoing descriptions of implementations, a person skilled in the art may clearly learn that the method according to the foregoing embodiments may be implemented by using software and a necessary general hardware platform, or certainly may be implemented by using hardware. However, in most cases, the former is a better implementation. Based on such an understanding, the technical solutions in this application essentially or the part contributing to the related art may be implemented in the form of a software product. The computer software product is stored in a storage medium (for example, a read-only memory (ROM)/random access memory (RAM), a magnetic disk or an optical disc), and includes several instructions for instructing a terminal device (which may be a mobile phone, a computer, a server, a network device or the like) to perform the method described in the embodiments of this application.

Figure 15:
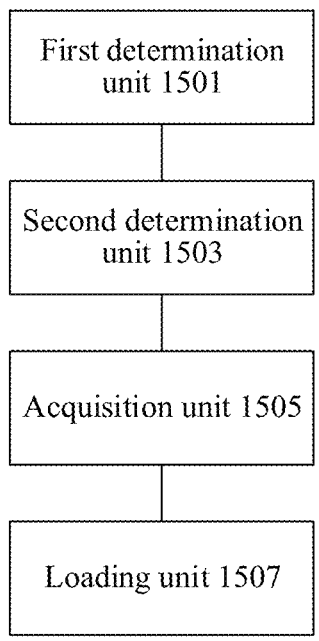
FIG. 15 is a schematic diagram of an optional object loading apparatus according to an embodiment of this application.

According to another aspect of the embodiments of this application, a loading apparatus of an object for implementing the foregoing object loading method is further provided. FIG. 15 is a schematic diagram of an optional object loading apparatus according to an embodiment of this application. As shown in FIG. 15, the apparatus may include: a first determination unit 1501, a second determination unit 1503, an acquisition unit 1505, and a loading unit 1507.

The first determination unit 1501 is configured to determine a visible space located within an acquisition range of an image acquisition device in a virtual scene, the image acquisition device being an acquisition device located at a first position in the virtual scene.

The second determination unit 1503 is configured to determine a target subspace located within a visible distance threshold indicated by a target type of a plurality of types in the visible space based on the first position, each type of the plurality of types having a visible distance threshold of an object in a subspace of the virtual scene.

The acquisition unit 1505 is configured to acquire an object whose visible distance is not greater than the visible distance threshold indicated by the target type in the target subspace as a to-be-rendered object.

The loading unit 1507 is configured to load the to-be-rendered object into the storage device for rendering.

The first determination unit 1501 in this embodiment may be configured to perform S202 in this embodiment of this application, the second determination unit 1503 in this embodiment may be configured to perform S204 in this embodiment of this application, the acquisition unit 1505 in this embodiment may be configured to perform S206 in this embodiment of this application, and the loading unit 1507 in this embodiment may be configured to perform S208 in this embodiment of this application.

Implemented examples and application scenarios of the foregoing modules are the same as those of the corresponding steps, but are not limited to the content disclosed in the foregoing embodiments. The foregoing modules may be run on the hardware environment shown in FIG. 1 as a part of the apparatus, and may be implemented by software, or may be implemented by hardware.

Through the foregoing modules, a visible space located inside an acquisition range of an image acquisition device in a virtual scene provided by a target application is determined; a target subspace located inside a visible distance threshold indicated by a target type of a plurality of types in the visible space is determined based on the first position; an object whose visible distance is not greater than the visible distance threshold indicated by the target type in the target subspace is acquired as a to-be-rendered object; and the to-be-rendered object is loaded in a storage resource of the user terminal where the target application is installed. Because loaded objects are actually visible to a user, a technical problem in the related art that a relatively large quantity of hardware resources are occupied to render objects in a virtual scene can be resolved, thereby significantly reducing the usage of memory resource, and reducing the consumption of hardware resources such as a CPU and a GPU.

Optionally, the second determination unit includes: a first acquisition module, configured to acquire a spacing distance between the subspace of the visible space and the first position; and a search module, configured to use a subspace whose spacing distance from the first position is not greater than the visible distance threshold indicated by the target type in the visible space as the target subspace.

Optionally, the acquisition unit includes: a second acquisition module, configured to acquire a configuration file, the configuration file recording objects associated with the each type of the plurality of types in the subspace of the virtual scene, each object in the subspace of the virtual scene being set, according to the visible distance, to be associated with one of the plurality of types; and a determination module, configured to acquire an object that is recorded in the configuration file and is associated with the target type in the target subspace as the to-be-rendered object.

Optionally, the loading unit includes: a first loading module, configured to continue, in a case that saved objects include the to-be-rendered object, to save the to-be-rendered object and delete objects other than the to-be-rendered object; and a second loading module, configured to delete, in a case that the saved objects do not include the to-be-rendered object, the saved objects, and load the to-be-rendered object.

Optionally, the apparatus of this application may further include: a rendering unit, configured to: set, after the to-be-rendered object is loaded in the storage resource of the user terminal where the target application is installed, a grid density of the target subspace to match a grid density corresponding to the target type, and render the to-be-rendered object in the target subspace after the grid density is set, any type of the plurality of types being used for indicating that an object whose visible distance is not greater than the visible distance threshold indicated by the any type in the subspace of the virtual scene is rendered according to the grid density corresponding to the any type, a grid density corresponding to a first type of the plurality of types being greater than a grid density corresponding to a second type of the plurality of types, a visible distance threshold indicated by the first type being less than a visible distance threshold indicated by the second type.

Optionally, the apparatus may further include: a third determination unit, configured to determine, before the visible space located inside the acquisition range of the image acquisition device in the virtual scene provided by the target application is determined, a grid density corresponding to the each type of the plurality of types; and a creation unit, configured to: create configuration information for the each type of the plurality of types according to the grid density corresponding to the each type of the plurality of types, and save the configuration information of the each type of the plurality of types to the configuration file, the configuration information recording an object in the subspace divided according to the corresponding grid density and a second position of the subspace.

Optionally, the foregoing third determination unit may include: a third acquisition module, configured to acquire the maximum visible distance and the minimum visible distance in visible distances of all objects in the virtual scene; and a density determination module, configured to determine the grid density corresponding to the each type of the plurality of types according to the maximum visible distance and the minimum visible distance.

The foregoing third acquisition module may further be configured to: acquire the visible distance of the each object in the virtual scene, the visible distance of the each object being a ratio of a first product to a second product of the each object, the first product being a product of multiplying the maximum value of coordinates of the each object in three dimensions in a three-dimensional coordinate system by a preset parameter, the second product being a product of multiplying a screen occupation ratio threshold by twice the tangent value of a target viewing angle of the image acquisition device; and search the visible distances of all the objects in the virtual scene for the maximum visible distance and the minimum visible distance.

The foregoing density determination module may further be configured to: round down a ratio of the maximum visible distance to the minimum visible distance to acquire a first threshold, the first threshold being used for representing the quantity of types of the plurality of types; and set a grid spacing represented by a grid density corresponding to the $i^{th}$ type of the plurality of types as i times a target spacing, i being an integer greater than 0 and less than or equal to the first threshold.

The foregoing creation unit may further be configured to: determine the subspace acquired by division according to the grid density corresponding to the each type of the plurality of types in the virtual scene; and search an object whose visible distance in each subspace matches the visible distance threshold indicated by the each type in the virtual scene, and saving an association relationship between the each subspace and the found object in the configuration information.

Implemented examples and application scenarios of the foregoing modules are the same as those of the corresponding steps, but are not limited to the content disclosed in the foregoing embodiments. The foregoing modules may be run on the hardware environment shown in FIG. 1 as a part of the apparatus, and may be implemented by software, or may be implemented by hardware. The hardware environment includes a network environment.

According to another aspect of the embodiments of this application, a server or a terminal configured to implement the foregoing object loading method is further provided.

Figure 16:
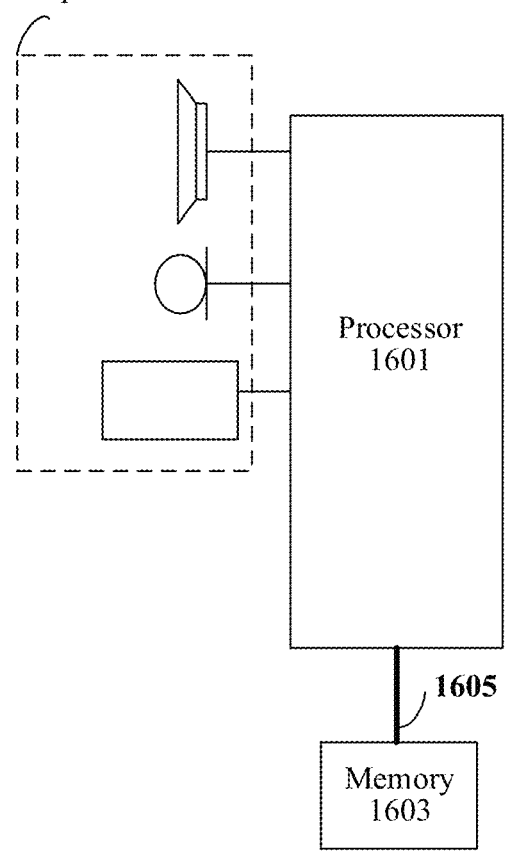
FIG. 16 is a structural block diagram of a terminal according to an embodiment of this application.

FIG. 16 is a structural block diagram of a terminal according to an embodiment of this application. As shown in FIG. 16, the terminal may include: one or more (only one processor is shown in FIG. 16) processors 1601, a memory 1603, and a transmission apparatus 1605. As shown in FIG. 16, the terminal may further include an input/output device 1607.

The memory 1603 may be configured to store a software program and a module, for example, a program instruction/module corresponding to the object loading method and apparatus in the embodiments of this application, and the processor 1601 performs various functional applications and data processing by running a software program and a module stored in the memory 1603, that is, implementing the foregoing object loading method. The memory 1603 may include a high speed random access memory, and may further include a non-volatile memory, for example, one or more magnetic storage devices, a flash memory, or another non-volatile solid-state memory. In some embodiments, the memory 1603 may further include memories remotely disposed relative to the processor 1601, and these remote memories may be connected to the terminal by using a network. Examples of the network include, but are not limited to, the Internet, an intranet, a local area network, a mobile communication network, and a combination thereof.

The transmission apparatus 1605 is configured to receive or send data by means of a network, or may further be configured to transmit data between the processor and the memory. A specific example of the foregoing network may include a wired network and a wireless network. In an example, the transmission apparatus 1605 includes a network interface controller (NIC), and the NIC may be connected to another network device and a router via a network cable to communicate with the Internet or a local area network. In an example, the transmission apparatus 1605 is a radio frequency (RF) module, configured to communicate with the Internet in a wireless manner.

Specifically, the memory 1603 is configured to store an application.

The processor 1601 may invoke, by using the transmission apparatus 1605, the application program stored in the memory 1603, to perform the following steps:

determining a visible space located within an acquisition range of an image acquisition device in a virtual scene, the image acquisition device being an acquisition device located at a first position in the virtual scene;

determining a target subspace located within a visible distance threshold indicated by a target type of a plurality of types in the visible space based on the first position, each type of the plurality of types having a visible distance threshold of an object in a subspace of the virtual scene;

acquiring an object whose visible distance is not greater than the visible distance threshold indicated by the target type in the target subspace as a to-be-rendered object; and loading the to-be-rendered object into the memory for rendering.

The processor 1601 is further configured to perform the following operations:

acquiring a spacing distance between the subspace of the visible space and the first position; and using a subspace whose spacing distance from the first position is not greater than the visible distance threshold indicated by the target type in the visible space as the target subspace.

Optionally, for a specific example in this embodiment, reference may be made to the example described in the foregoing embodiment, and details are not described herein again in this embodiment.

A person of ordinary skill in the art may understand that the structure shown in FIG. 16 is merely an example, and the terminal may be a terminal device such as a smartphone (for example, an Android mobile phone and an iOS mobile phone), a tablet computer, a palmtop computer, a mobile internet device (MID), and a PAD. FIG. 16 does not constitute a limitation on the structure of the foregoing electronic device. For example, the terminal may further include more or fewer components (for example, a network interface and a display apparatus) than those shown in FIG. 16, or have configuration different with that shown in FIG. 16.

A person of ordinary skill in the art may understand that all or some of the steps of the methods in the foregoing embodiments may be implemented by a program instructing relevant hardware of the terminal device. The program may be stored in a computer-readable storage medium. The storage medium may include a flash disk, a ROM, a RAM, a magnetic disk, an optical disc, and the like.

An embodiment of this application further provides a storage medium. Optionally, in this embodiment, the storage medium may be configured to perform program code of an object loading method.

Optionally, in this embodiment, the storage medium may be located in at least one network device in a plurality of network devices in networks shown in the foregoing embodiments.

Optionally, in this embodiment, the storage medium is configured to store program code for performing the following steps:

determining a visible space located inside an acquisition range of an image acquisition device in a virtual scene, the image acquisition device being an acquisition device located at a first position in the virtual scene;

determining a target subspace located inside a visible distance threshold indicated by a target type of a plurality of types in the visible space based on the first position, each type of the plurality of types being used for indicating a visible distance threshold of an object in a subspace of the virtual scene;

acquiring an object whose visible distance is not greater than the visible distance threshold indicated by the target type in the target subspace as a to-be-rendered object; and loading the to-be-rendered object.

Optionally, the storage medium is further configured to store program code for performing the following step:

acquiring a spacing distance between the subspace of the visible space and the first position; and using a subspace whose spacing distance from the first position is not greater than the visible distance threshold indicated by the target type in the visible space as the target subspace.

Optionally, for a specific example in this embodiment, reference may be made to the example described in the foregoing embodiment, and details are not described herein again in this embodiment.

Optionally, in this embodiment, the storage medium may include, but is not limited to, any medium that can store program code such as a USB flash drive, a ROM, a RAM, a removable hard disk, a magnetic disk, or an optical disc.

An embodiment of this application further provides a computer program product. The computer program product includes instructions, the instructions, when run on a computer, causing the computer to perform the foregoing object loading method.

The sequence numbers of the foregoing embodiments of this application are merely for the convenience of description, and do not imply the preference among the embodiments.

When the integrated unit in the foregoing embodiments is implemented in the form of a software functional unit and sold or used as an independent product, the integrated unit may be stored in the foregoing computer-readable storage medium. Based on such an understanding, the technical solution of this application essentially, or a part contributing to the related art, or all or a part of the technical solution may be implemented in a form of a software product. The computer software product is stored in a storage medium and includes several instructions for instructing one or more computer devices (which may be a PC, a server, a network device or the like) to perform all or some of steps of the methods in the embodiments of this application.

In the foregoing embodiments of this application, descriptions of the embodiments have different emphases. As for parts that are not described in detail in one embodiment, reference can be made to the relevant descriptions of the other embodiments.

In the several embodiments provided in this application, it is understood that the disclosed client may be implemented in other manners. The described apparatus embodiment is merely an example. For example, the unit division is merely logical function division and may be another division in an actual implementation. For example, a plurality of units or components may be combined or integrated into another system, or some features may be ignored or not performed. In addition, the coupling, or direct coupling, or communication connection between the displayed or discussed components may be the indirect coupling or communication connection by means of some interfaces, units, or modules, and may be in electrical or other forms. In this application, the term "module" or "unit" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof.

The units described as separate parts may or may not be physically separate. Parts displayed as units may or may not be physical units, and may be located in one position, or may be distributed on a plurality of network units. Some or all of the units may be selected according to actual requirements to achieve the objectives of the solutions in the embodiments.

In addition, functional units in the embodiments of this application may be integrated into one processing unit, or each of the units may exist alone physically, or two or more units are integrated into one unit. The integrated unit may be implemented in the form of hardware, or may be implemented in the form of a software function unit.

The foregoing descriptions are merely exemplary implementations of this application. A person of ordinary skill in the art may further make several improvements and refinements without departing from the principle of this application, and the improvements and refinements shall fall within the protection scope of this application.

What is claimed is:

1. An object loading method, applied to an electronic device having a processor and memory storing a plurality of computer programs to be executed by the processor, the method comprising:

determining a visible space located within an acquisition range of an image acquisition device in a virtual scene, the image acquisition device being an acquisition device located at a first position in the virtual scene;

determining a target subspace located within a visible distance threshold indicated by a target type of a plurality of types in the visible space based on the first position, each type of the plurality of types having a visible distance threshold of an object in a subspace of the virtual scene;

acquiring an object whose visible distance is not greater than the visible distance threshold indicated by the target type in the target subspace as a to-be-rendered object;

loading the to-be-rendered object into the memory for rendering on a display of the electronic device:

setting a grid density of the target subspace to match a grid density corresponding to the target type; and rendering the to-be-rendered object in the target subspace according to the set grid density of the target subspace corresponding to the target type.

2. The method according to claim 1, wherein the determining a target subspace located within a visible distance threshold indicated by a target type of a plurality of types in the visible space based on the first position comprises:

acquiring a spacing distance between the subspace of the visible space and the first position; and using a subspace whose spacing distance from the first position is not greater than the visible distance threshold indicated by the target type in the visible space as the target subspace.

3. The method according to claim 1, wherein the acquiring an object whose visible distance is not greater than the visible distance threshold indicated by the target type in the target subspace as a to-be-rendered object comprises:
acquiring a configuration file, the configuration file recording objects associated with the plurality of types in the subspace of the virtual scene, each object in the subspace of the virtual scene being set, according to the visible distance, to be associated with one of the plurality of types; and
acquiring an object that is recorded in the configuration file and is associated with the target type in the target subspace as the to-be-rendered object.

4. The method according to claim 1, wherein the loading the to-be-rendered object into the memory comprises:
determining that the to-be-rendered object is one of existing objects saved in the memory; and
deleting the other existing objects other than the to-be-rendered object from the memory while keeping the to-be-rendered object in the memory.

5. The method according to claim 1,
wherein any type of the plurality of types being used for indicating that an object whose visible distance is not greater than the visible distance threshold indicated by the any type in the subspace of the virtual scene is rendered according to the grid density corresponding to the any type, a grid density corresponding to a first type of the plurality of types being greater than a grid density corresponding to a second type of the plurality of types, a visible distance threshold indicated by the first type being less than a visible distance threshold indicated by the second type.

6. The method according to claim 1, before the determining a visible space located inside an acquisition range of an image acquisition device in a virtual scene, the method further comprising:
determining a grid density corresponding to the each type of the plurality of types; and
creating configuration information for the each type of the plurality of types according to the grid density corresponding to the each type of the plurality of types, and saving the configuration information of the each type of the plurality of types to the configuration file, the configuration information recording an object in the subspace divided according to the corresponding grid density and a second position of the subspace.

7. The method according to claim 6, wherein the determining a grid density corresponding to the each type of the plurality of types comprises:
acquiring the maximum visible distance and the minimum visible distance in visible distances of all objects in the virtual scene; and
determining the grid density corresponding to the each type of the plurality of types according to the maximum visible distance and the minimum visible distance.

8. The method according to claim 7, wherein the acquiring the maximum visible distance and the minimum visible distance in visible distances of all objects in the virtual scene comprises:
acquiring the visible distance of the each object in the virtual scene, the visible distance of the each object being a ratio of a first product to a second product of the each object, the first product being a product of multiplying the maximum value of coordinates of the each object in three dimensions in a three-dimensional coordinate system by a preset parameter, the second product being a product of multiplying a screen occupation ratio threshold by twice the tangent value of a target viewing angle of the image acquisition device; and
searching the visible distances of all the objects in the virtual scene for the maximum visible distance and the minimum visible distance.

9. The method according to claim 7, wherein the determining the grid density corresponding to the each type of the plurality of types according to the maximum visible distance and the minimum visible distance comprises:
rounding down a ratio of the maximum visible distance to the minimum visible distance to acquire a first threshold, the first threshold being used for representing the quantity of types of the plurality of types; and
setting a grid spacing represented by a grid density corresponding to the ith type of the plurality of types as i times a target spacing, i being an integer greater than 0 and less than or equal to the first threshold.

10. The method according to claim 6, wherein the creating configuration information for the each type of the plurality of types according to the grid density corresponding to the each type of the plurality of types comprises:
determining the subspace acquired by division according to the grid density corresponding to the each type of the plurality of types in the virtual scene; and
searching an object whose visible distance in each subspace matches the visible distance threshold indicated by the each type in the virtual scene, and saving an association relationship between the each subspace and the found object in the configuration information.

11. An electronic device, comprising a memory, a processor, and a plurality of computer programs stored in the memory that, when executed by the processor, cause the electronic device to perform a plurality of operations including:
determining a visible space located within an acquisition range of an image acquisition device in a virtual scene, the image acquisition device being an acquisition device located at a first position in the virtual scene;
determining a target subspace located within a visible distance threshold indicated by a target type of a plurality of types in the visible space based on the first position, each type of the plurality of types having a visible distance threshold of an object in a subspace of the virtual scene;
acquiring an object whose visible distance is not greater than the visible distance threshold indicated by the target type in the target subspace as a to-be-rendered object;
loading the to-be-rendered object into the memory for rendering on a display of the electronic device;
setting a grid density of the target subspace to match a grid density corresponding to the target type; and
rendering the to-be-rendered object in the target subspace according to the set grid density of the target subspace corresponding to the target type.

12. The electronic device according to claim 11, wherein the determining a target subspace located within a visible distance threshold indicated by a target type of a plurality of types in the visible space based on the first position comprises:
acquiring a spacing distance between the subspace of the visible space and the first position; and using a subspace whose spacing distance from the first position is not greater than the visible distance threshold indicated by the target type in the visible space as the target subspace.

13. The electronic device according to claim 11, wherein the acquiring an object whose visible distance is not greater than the visible distance threshold indicated by the target type in the target subspace as a to-be-rendered object comprises:
    acquiring a configuration file, the configuration file recording objects associated with the plurality of types in the subspace of the virtual scene, each object in the subspace of the virtual scene being set, according to the visible distance, to be associated with one of the plurality of types; and
    acquiring an object that is recorded in the configuration file and is associated with the target type in the target subspace as the to-be-rendered object.

14. The electronic device according to claim 11, wherein the loading the to-be-rendered object into the memory comprises:
    determining that the to-be-rendered object is one of existing objects saved in the memory; and
    deleting the other existing objects other than the to-be-rendered object from the memory while keeping the to-be-rendered object in the memory.

15. The electronic device according to claim 11, wherein any type of the plurality of types being used for indicating that an object whose visible distance is not greater than the visible distance threshold indicated by the any type in the subspace of the virtual scene is rendered according to the grid density corresponding to the any type, a grid density corresponding to a first type of the plurality of types being greater than a grid density corresponding to a second type of the plurality of types, a visible distance threshold indicated by the first type being less than a visible distance threshold indicated by the second type.

16. The electronic device according to claim 11, wherein the plurality of operations further comprise:
    before determining the visible space located within the acquisition range of the image acquisition device in the virtual scene:
    determining a grid density corresponding to the each type of the plurality of types; and
    creating configuration information for the each type of the plurality of types according to the grid density corresponding to the each type of the plurality of types, and saving the configuration information of the each type of the plurality of types to the configuration file, the configuration information recording an object in the subspace divided according to the corresponding grid density and a second position of the subspace.

17. The electronic device according to claim 16, wherein the determining a grid density corresponding to the each type of the plurality of types comprises:
    acquiring the maximum visible distance and the minimum visible distance in visible distances of all objects in the virtual scene; and
    determining the grid density corresponding to the each type of the plurality of types according to the maximum visible distance and the minimum visible distance.

18. The electronic device according to claim 17, wherein the acquiring the maximum visible distance and the minimum visible distance in visible distances of all objects in the virtual scene comprises:
    acquiring the visible distance of the each object in the virtual scene, the visible distance of the each object being a ratio of a first product to a second product of the each object, the first product being a product of multiplying the maximum value of coordinates of the each object in three dimensions in a three-dimensional coordinate system by a preset parameter, the second product being a product of multiplying a screen occupation ratio threshold by twice the tangent value of a target viewing angle of the image acquisition device; and
    searching the visible distances of all the objects in the virtual scene for the maximum visible distance and the minimum visible distance.

19. The electronic device according to claim 16, wherein the creating configuration information for the each type of the plurality of types according to the grid density corresponding to the each type of the plurality of types comprises:
    determining the subspace acquired by division according to the grid density corresponding to the each type of the plurality of types in the virtual scene; and
    searching an object whose visible distance in each subspace matches the visible distance threshold indicated by the each type in the virtual scene, and saving an association relationship between the each subspace and the found object in the configuration information.

20. A non-transitory computer-readable storage medium, the storage medium storing a plurality of computer programs, wherein the computer programs, when executed by a processor of an electronic device, cause the electronic device to perform a plurality of operations including:
    determining a visible space located within an acquisition range of an image acquisition device in a virtual scene, the image acquisition device being an acquisition device located at a first position in the virtual scene;
    determining a target subspace located within a visible distance threshold indicated by a target type of a plurality of types in the visible space based on the first position, each type of the plurality of types having a visible distance threshold of an object in a subspace of the virtual scene;
    acquiring an object whose visible distance is not greater than the visible distance threshold indicated by the target type in the target subspace as a to-be-rendered object;
    loading the to-be-rendered object into the memory for rendering on a display of the electronic device;
    setting a grid density of the target subspace to match a grid density corresponding to the target type; and
    rendering the to-be-rendered object in the target subspace according to the set grid density of the target subspace corresponding to the target type.

\* \* \* \* \*